United States Patent Office 3,446,875
Patented May 27, 1969

3,446,875
TRANSPARENT DENTURES
Paul Brückmann, Heino Logemann, and Carlhans Suling, Leverkusen, Germany, assignors to Farbenfabriken Bayer Aktiengesellschaft, Leverkusen, Germany, a corporation of Germany
No Drawing. Filed Jan. 13, 1964, Ser. No. 337,153
Claims priority, application Germany, Jan. 18, 1963, F 38,791
Int. Cl. A61c *13/22;* C08c *29/46*
U.S. Cl. 260—885      1 Claim

ABSTRACT OF THE DISCLOSURE

Transparent dental prosthesis prepared by the powder/liquid process wherein a mixture of finely divided bead methacrylate polymer is mixed with a liquid monomer which monomer comprises an acrylic or methacrylic acid ester containing at least one free hydroxyl group, preferably hydroxypropyl acrylate.

---

The present invention relates to novel dental prostheses and to an improved process for producing the same. More particularly, the invention involves the provision of unique transparent dental prostheses which possess extremely good consumer properties, good strength characteristics and very extensive processability, via the so-called "powder-lined process" in which the liquid employed consists of a methacrylic acid and/or an acrylic acid ester containing at least one free hydroxyl (OH) group in its molecule, and preferably as a mixture with methyl methacrylate. Optionally, the liquid may also contain a cross-linking agent, that is, a compound containing in its molecular configuration at least two olefinic double bonds which are capable of being polymerized.

In dental technology, it is known that dental prostheses may be produced in accordance with the aforesaid powder-liquid process (see German Patent No. 737,058 and United States Patent No. 2,122,306) by curing a mixture of about three parts of a finely-divided bead polymer, consisting largely of combined methyl methacrylate, and one part of monomeric methyl methacrylate at an elevated temperature and in the presence of a catalyst such as benzoyl peroxide, within a two-part denture flask of gypsum which serves as the mold.

Modifications of the foregoing basic process have also been described heretofore in which resins, plasticizers or dyestuffs are added to the polymer employed, and by making use of copolymers, for example, in place of the homopolymer of methyl methacrylate, wherein the latter admittedly consist of a major portion of combined methyl methacrylate, but nevertheless, also contain other combined vinyl compounds, vinylidine compounds or divinyl compounds as the second component.

It is further well established that the processing properties of the prostheses may be improved by employing, in lieu of the single powder with the above-mentioned additives in the powder-liquid process, mixtures of at least two polymers as the powder, wherein these differ in respect of their mean particle size and are also characterized, in that, one of the powder components consists of a homopolymer of methyl methacrylate and the other powder component consists of a copolymer of methyl methacrylate. In this improved process, the mean particle size of the homopolymer component is adjusted to insure that it is greater than the mean particle size of the copolymer component. The copolymers thus employed consist of methyl methacrylate polymers containing acrylic acid esters of lower alcohols, butadiene, and esters of methacrylic acid as the comonomers, and for this purpose, the esters of methacrylic acid should be esters of alcohols with more than 4 carbon atoms (see German Patent No. 940,493).

If, in the liquid, monomers are employed which differ substantially from the methacrylic acid methyl ester, difficulties may be encountered, e.g., with respect to the remaining monomer not consumed in the polymerization process, by reason of its physiological properties. In addition, if, for example, repair of a denture becomes necessary or desirable, monomeric methacrylic-acid-methyl-ester-containing materials are usually utilized. Dentures made of styrene-containing polymers are, as is now well established, quite apt to form capillary cracks.

Significantly, despite the aforementioned modifications of the powder component, no dental prostheses have yet been obtained which fully satisfy the cosmetic criteria, consumer demands, or even the requirements with respect to processing characteristics.

Still other processes have been described in the patent and technical literature, whereby the intent is to satisfy the high requirements made in respect of dental prostheses by adding other monomers to the methyl methacrylate employed as the liquid in the powder-liquid process. Thus, for instance, it is known that the strength properties, cosmetic properties, and general processing characteristics may be improved by the addition of monomers such as the esters of acrylic and methacrylic acids with alcohols containing from 8 to 10 carbon atoms, or by adding cyclohexyl methacrylate, methoxy-ethyl methacrylate, butoxyethyl methacrylate, tetrahydrofurfuryl methacrylate or dichlorostyrene. Even all of these additives proved insufficient, however, towards permitting the production of dental prostheses via the powder-liquid process which satisfy the high requirements of both the consumer and dental practitioner in every respect. For example, a particular disadvantage stems from the fact that the above-enumerated additives cannot prevent the prostheses from becoming opaque or nontransparent at locations where their wall thickness is necessarily low. As a result, there exists the possibility of failing to detect faults which might possibly have developed during manufacture of the prostheses.

As indicated hereinbefore, the present invention is based on our discovery that transparent dental prostheses possessing very good consumer properties, good strength characteristics and very extensive processability can be produced via the powder-liquid process when the liquid employed consists of a methacrylic acid and/or acrylic acid ester containing at least one free hydroxyl group in its molecule. Preferably, the foregoing liquid is employed as a mixture with methyl methacrylate, and optionally, with a suitable cross-linking agent consisting of a compound containing at least two olefinic polymerizable bonds in its molecular configuration. Additionally, in accordance with the processing technique of the invention, a mixture of methyl methacrylate and a methacrylic acid amide and/or acrylic acid amide containing in its molecule at least one free hydroxyl group and/or an ether grouping can be employed as the liquid. Unsaturated polymerizable acids or anhydrides thereof can also be added to the liquid monomer or to the polymer.

In accordance with the preferred processing technique of our invention, at least 40 percent by weight of methyl methacrylate is employed in the prostheses mixtures. The term "acrylic or methacrylic acid esters containing at least one free hydroxyl group in their molecule," as used herein and within the appended claims, refers to compounds represented by the following formula:

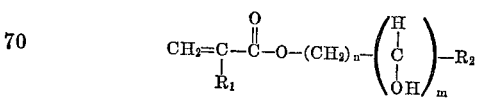

wherein $R_1$ and $R_2$ are hydrogen or lower alkyl of 1 to 4 carbon atoms, such as a methyl group, for example, and $n$ and $m$ are integers of 1 to 4. In contrast to the previously known additives described hereinabove, the compounds represented by the foregoing formula exhibit a certain degree of hydrophilicity by reason of the presence of the free hydroxyl group therein. As specific examples of typical compounds represented by the foregoing formula, there are included hydroxyethyl acrylate, hydroxyethyl methacrylate, hydroxypropyl acrylate, hydroxypropyl methacrylate, glycerine monoacrylate and glycerine monomethacrylate.

In order to insure good properties in the final prostheses it is quite important to have good compatibility between the hydroxyester and the methyl methacrylate, and to obtain sufficient hardness for the polymers. In this connection, hydroxypropyl methacrylate proved to be particularly suitable in the practice of the invention.

The quantity of the hydroxy-component employed varies in relationship to the compound employed, but it should preferably be maintained within the range of from 5 to 50 percent by weight. The third component in the liquid, namely, the cross-linking agent, is added to the mixture in a proportion of from 0.5 to 20 percent by weight, and preferably within the range of from 2 to 10 percent by weight. Suitable cross-linking agents include, for example, glycol diacrylate, divinylbenzene, triacrylformal, glycerine triacrylate and glycerine trimethacrylate.

Curing of the shaped product in the gypsum mold is generally effected in accordance with conventional practices, with the addition of a polymerization catalyst capable of forming radicals such, for example, as benzoyl peroxide, in a water bath maintained at approximately 100° C.

Particularly good results are achieved in accordance with the process of the invention when a mixture of two polymers is employed as the powder. For this purpose, the mixture should preferably consist of a homopolymer of methyl methacrylate and a copolymer of methyl methacrylate, and the mean particle size of the homopolymer of methyl methacrylate should be larger than the mean particle size of the copolymer of methyl methacrylate.

Pursuant to the process of the invention, transparent prostheses are even obtained when the molded product is not cured in the gypsum denture flask within a water bath maintained at 100° C., but rather, when the curing or polymerization in the gypsum denture flask is effected in a drying cabinet, wherein much more intense opacities tend to be formed from the customary mixtures.

It is believed that the invention may be best understood by reference to the following specific examples illustrating the application of the foregoing principles and procedures to the production of typical prostheses:

EXAMPLE I

Three (3) parts by weight of a bead polymer, containing 95 parts by weight of methyl methacrylate and 5 parts by weight of ethyl acrylate, and having a mean bead diameter of 0.05 mm. a value for [$\eta$] of 0.9, were mixed with 1 part by volume of nonomeric methyl methacrylate and 0.01 part by weight of benzoyl peroxide. After swelling, the mixture was thoroughly kneaded and the resultant pulp was filled into the prostheseis mold in a two-part denture flask of gypsum. The gypsum mold was previously insulated with a 2 percent aqueous solution of sodium alginate. The closed denture flask was then inserted in a water bath at 20° C., which was taken up to 100° C. within a half hour period, and maintained at this temperature for an additional one-half hour. The plastic template which was removed from the mold after cooling exhibited a distinct milky opacity which further intensified on storage in air for 2–3 days.

When the monomeric methyl methacrylate was replaced in the foregoing operation, however, by a mixture of 80 parts of methyl methacrylate and 20 parts of hydroxypropyl methacrylate, or 70 parts of methyl methacrylate and 30 parts of hydroxypropyl methacrylate, or 60 parts of methyl methacrylate and 40 parts of hydroxypropyl methacrylate, or 50 parts of methyl methacrylate and 50 parts of hydroxypropyl methacrylate, or 30 parts of methyl methacrylate and 70 parts of hydroxypropyl methacrylate, the opacity was increasingly reduced as the proportion of hydroxypropyl methacrylate was increased. The same results were obtained when hydroxyethyl methacrylate or hydroxypropyl acrylate was employed in place of the hydroxypropyl methacrylate. An addition of 5 percent of glycol dimethylacrylate to the liquid caused the molded products to exhibit greater hardness, and also almost complete absence of fine cracks during the polishing of repaired molded products.

Example II

Three (3) parts by weight of a mixture containing 80 parts by weight of a bead polymer of methyl methacrylate, having a mean bead diameter of 0.09 mm. and a value for [$\eta$] of 0.7, and 20 parts by weight of a bead polymer containing 80 parts by weight of combined methyl methacrylate and 20 parts by weight of combined ethyl acrylate, having a bead diameter of 0.05 mm. and a value for [$\eta$] of 0.7, were mixed with 0.01 parts by weight of benzoyl peroxide and 1 part by volume of monomeric methyl methacrylate. After swelling, the mixture was thoroughly kneaded and the resultant pulp was filled into a prothesis mold in a two-part denture flask of gypsum. The gypsum mold was previously insulated with a 2 percent aqueous solution of sodium alginate. The closed denture flask was then inserted in a water bath at 20° C., which was taken up to 100° C. within a one-half hour period and maintained at this temperature for an additional one-half hour. The plastic template which was removed from the mold after cooling exhibited a milky opacity which further intensified within a few days as it was stored in air.

On the other hand, when the monomeric methyl methacrylate was replaced in the above-described operation by a mixture of:

80 parts of methyl methacrylate and, 20 parts of hydroxyethyl methacrylate, or
70 parts of methyl methacrylate and, 30 parts of hydroxyethyl methacrylate, or
60 parts of methyl methacrylate and, 40 parts of hydroxyethyl methacrylate, or
50 parts of methyl methacrylate and, 50 parts of hydroxyethyl methacrylate the opacity was reduced as the proportion of hydroxyethyl methacrylate was increased, and the processing characteristics improved at the same time.

When hydroxypropyl methacrylate or hydroxypropyl acrylate was employed in place of the hydroxyethyl methacrylate, and the conditions were otherwise maintained identical, substantially the same results were achieved. When, in still another experimental series an addition of 5 percent of glycol dimethylacrylate was made to the monomer liquid at the same time, the resultant molded products possessed greater hardness and improved polishing characteristics.

Example III

Three (3) parts by weight of a mixture of two pearl polymers composed of polymethacrylic acid methyl ester and a copolymer therefrom, in accordance with the procedure described in Example II, were admixed with a mixture of 10 and/or 20 parts by volume of methacrylic acid dihydroxy propyl ester and 90 and/or 80 parts by volume of methacrylic acid methyl ester. In comparison with methacrylic acid oxy-ethyl ester and methacrylic acid oxy-propyl ester, the dihydroxy propyl ester proved to be twice as effective with respect to suppressing the darkening occurring during the manufacture of the denture in the water bath.

Example IV

Three (3) parts by weight of a mixture of two pearl polymers, composed of polymethacrylic acid methyl ester and a copolymer therefrom, prepared in accordance with the procedure described in Example II, were admixed with 1 part by volume of a mixture consisting of an equal amount by volume of methacrylic acid methyl ester and the monomethacrylic acid ester of diethylene diglycol. Following polymerization in the plaster mold within the water bath, clear dentures were obtained.

What is claimed is:

1. A transparent denture produced from a liquid component and acrylic polymers and copolymers as powder component in which the liquid component contains 5-50% by weight of hydroxypropyl methacrylate in admixture with methyl methacrylate.

References Cited

UNITED STATES PATENTS

| | | | |
|---|---|---|---|
| 2,484,487 | 10/1949 | Caldwell | 260—86.1 |
| 2,569,767 | 10/1951 | Knock | 260—885 |
| 3,172,868 | 3/1965 | Jefferson | 260—885 |
| 2,745,817 | 5/1956 | Logemann et al. | 260—885 |

FOREIGN PATENTS

| | | |
|---|---|---|
| 569,974 | 6/1945 | Great Britain. |
| 940,493 | 3/1956 | Germany. |

SAMUEL H. BLECH, *Primary Examiner.*

JOHN T. GOOLKASIAN, *Assistant Examiner.*

U.S. Cl. X.R.

32—2; 260—86.1